United States Patent [19]
Ishida

[11] Patent Number: 5,907,209
[45] Date of Patent: May 25, 1999

[54] LUNDELL CORE TYPE ROTARY ELECTRIC MACHINE

[75] Inventor: Hiroshi Ishida, Anjo, Japan

[73] Assignee: Denso Corporation, Kariya, Japan

[21] Appl. No.: 09/006,389

[22] Filed: Jan. 13, 1998

[30] Foreign Application Priority Data

Jan. 16, 1997 [JP] Japan .................................. 9-005227

[51] Int. Cl.⁶ .................................................. H02K 1/22
[52] U.S. Cl. ............................................................ 310/263
[58] Field of Search .................................. 310/263, 261, 310/156

[56] References Cited

U.S. PATENT DOCUMENTS

| | | | |
|---|---|---|---|
| 4,302,693 | 11/1981 | Burgmeier et al. | 310/156 |
| 4,959,577 | 9/1990 | Radomski | 310/263 |
| 5,306,977 | 4/1994 | Hayashi | 310/263 |
| 5,483,116 | 1/1996 | Kusase et al. | 310/263 |

FOREIGN PATENT DOCUMENTS

| | | |
|---|---|---|
| 61-85045 | 4/1986 | Japan . |
| 3-265450 | 11/1991 | Japan . |
| 7-312854 | 11/1995 | Japan . |

*Primary Examiner*—Nestor Ramirez
*Assistant Examiner*—Dang Dinh Le
*Attorney, Agent, or Firm*—Pillsbury Madison & Sutro

[57] ABSTRACT

A magnet holding member is mounted onto a rotor of an alternator, and holds permanent magnets inserted between the claws of pole cores. The magnet holding member has twelve housing parts each of which has corrugated side surfaces which serve as shock absorbing structures to relieve stress when excessive stress is exerted thereon by the claws of the pole cores. The magnet holding member is manufactured in a state in which the housing parts are arranged in the shape of a belt and are connected with connecting parts. The magnet holding member is bent into an annular shape after the permanent magnets are pressed into the housing parts, and is then mounted onto the rotor. To facilitate ease of manufacture of the magnet holding member, the openings of each housing part face the same direction.

26 Claims, 8 Drawing Sheets

LUNDELL CORE TYPE ROTARY ELECTRIC MACHINE

CROSS REFERENCE TO RELATED APPLICATION

This application relates to and incorporates herein by reference Japanese Patent Application No. 9-5227 filed on Jan. 16, 1997.

BACKGROUND OF THE INVENTION

1. Field of the Invention

The present invention relates to a Lundell core type rotary electric machine having a rotor using Lundell-type pole cores.

2. Description of Related Art

A conventional vehicle alternating current generator is provided with a rotor using Lundell-type pole cores each of which has a plurality of claws, and generates electric power by rotating of the rotor. In recent years the electric load demands placed on vehicle electric systems have increased. Thus, the output power requirements of vehicle alternating current generators have increased. In some known generators, in order to increase power output permanent magnets magnetized in a direction diminishing magnetic flux leakage are inserted between the claws of the pole cores. For example, JP-A 7-312854, 3-150055 (U.S. Pat. No. 4,959,577), and 61-85045, disclose AC generator rotors having permanent magnets magnetized in a direction diminishing magnetic flux leakage are inserted between the claws of the pole cores. Since a plurality of separate permanent magnets are separately inserted between the claws of the pole cores in the rotor of the alternating current generator, the rotor is not easy to assemble.

JP-A 7-123664 (U.S. Pat. No. 5,483,116) and 3-265450 disclose an improved device which is easier to assemble. In the rotor of the alternating current generator disclosed in JP-A 7-123664, sixteen permanent magnets are inserted into a magnet holding member made of resin and spirally wound in the shape of a crown. The magnet holding member and the inserted permanent magnets are engaged using collars formed between the claws of the pole cores or by making the cross section of the magnet holding member in the direction of the rotation a trapezoidal shape, whereby the rotor is assembled into the magnet holding member together with the permanent magnets. In the rotor of the alternating current generator disclosed in JP-A 3-265450, the permanent magnets are arranged in the recesses which are formed on the inner peripheral side of a generally cylindrical non-magnetic ring filling the gaps between the claws of the pole cores and the rotor is assembled in the state that the permanent magnets are arranged in the non-magnetic ring.

In the magnet holding member used in the rotor disclosed in JP-A 7-123664 and the non-magnetic ring used in the rotor disclosed in JP-A 3-265450, the outer peripheral shape thereof must be matched with the shape of the inside surface and the shape of the side surface of the claws. If manufacturing errors in dimension of the pole cores or the magnets or in assembling the pole cores are not tolerable, it is likely that unnecessary stress is exerted on the permanent magnets and that the permanent magnets are cracked or chipped at the worst case, which results in a reduction in the output power of the alternating current generator, a breakage of the stator winding, or the like.

Moreover, the magnet holding member or the non-magnetic ring has a complicated shape and therefore it is not easy to form it from a non-magnetic material such as resin. The magnet holding member disclosed in JP-A 7-123664, for example, can not be easily formed by using two-way dies resulting in an increase of manufacturing cost.

SUMMARY OF THE INVENTION

It is therefore an object of the present invention to obviate the above drawbacks.

It is a further object of the present invention to provide a Lundell core type rotary electric machine which can relieve a stress concentration exerted locally on a permanent magnet which is caused by manufacturing errors in dimension and in assembling.

It is a still further object of the present invention to provide a Lundell core type rotary electric machine which uses a simplified magnet holding structure for permanent magnets inserted between the claws of pole cores.

According to the present invention, a rotor of a Lundell core type rotary electric machine has a magnet holding member whose shock absorbing structure is integrally formed, whereby the excessive stress caused by manufacturing errors and the like is relieved. The shock absorbing structure is put into partial contact with permanent magnets or claws to be deformed when assembled. More specifically, the shock absorbing structure includes corrugated portions, partial projections, bent portions, or the like which are formed on the side surfaces of a box-like housing parts. It is deformable before the permanent magnets are cracked or chipped when the magnet holding member is assembled, and reduces the stress exerted on the permanent magnet.

The housing parts between the claws are connected by connecting parts. Thus a plurality of housing parts can be integrated and handled as a single part. If a plurality of housing parts are connected in this way, it is preferable that the housing parts are connected in an annular shape. The magnet holding member can be manufactured by arranging the housing parts in the annular shape from the beginning. In addition, the magnet holding member can also be manufactured by forming a belt-like member at first in which the housing parts are arranged in the shape of a belt and then by bending it along a curved. The magnet holding member may be manufactured by die-casting or the like to form a belt-like member having housing parts arranged in the shape of a belt and held together with connecting parts, and then is bent into an annular shape. It is then assembled between the claws of the belt-shaped pole cores. Since the magnet holding member can be handled on a flat plane and has a simple shape, it can be easily manufactured using two-way dies, for example, which can simplify the manufacturing process and reduce manufacturing costs.

Further, when the magnet holding member whose housing parts are arranged in a belt shape is formed into an annular shape and assembled, the magnet holding member may be formed like an annular part by mechanically joining the connecting parts formed at both ends of the belt-like member to each other. In this arrangement, grip portions may be formed on the housing parts and disposed at both ends of the belt-like member, so the member can be easily bent by gripping the grip portions. When this bending is automated, the grip portions can prevent an arm member of an assembling device from being magnetized by the permanent magnets housed in the housing parts.

Furthermore, the time at which the permanent magnets are inserted into the housing parts is determined according to the direction of the opening faces of the housing parts having a box-like shape. That is, if the opening faces are formed such that they face the radially inward (toward the rotary shaft), when the magnet holding member is bent to form the annular shape, it is necessary that the permanent magnets are inserted into the housing parts before the rotor is assembled. A magnet holding member having housing parts arranged in the shape of a belt and bent into an annular shape may be used, making easy to insert the permanent magnets. This is because the permanent magnets can be inserted in the state in which the housing parts are arranged in the shape of a belt. Also, if the opening faces face toward the rotary shaft when the magnet holding member is bent into the annular shape, it is also possible to insert the permanent magnets into the housing parts between the claws of the pole cores in the direction of the rotary shaft after the rotor is assembled, which increases the freedom in the manufacturing process.

In addition, the housing parts may be put into partial contact with the collars formed on the outer peripheral surfaces of the claws of the pole cores to prevent the housing parts from being moved in the centrifugal direction. The housing parts, which are formed into a rectangular box-like shape are not restrained from moving in the centrifugal direction. Thus, it is necessary to have some means for restraining the movement of the housing parts in the centrifugal direction. In one effective method, the housing parts are used in combination with collars formed on the claws.

BRIEF DESCRIPTION OF THE DRAWINGS

Other objects, features and advantages of the present invention will become more apparent from the following detailed description when read with reference to the accompanying drawings. In the accompanying drawings.

DETAILED DESCRIPTION OF THE PREFERRED EMBODIMENTS

First Embodiment

Figure 1:
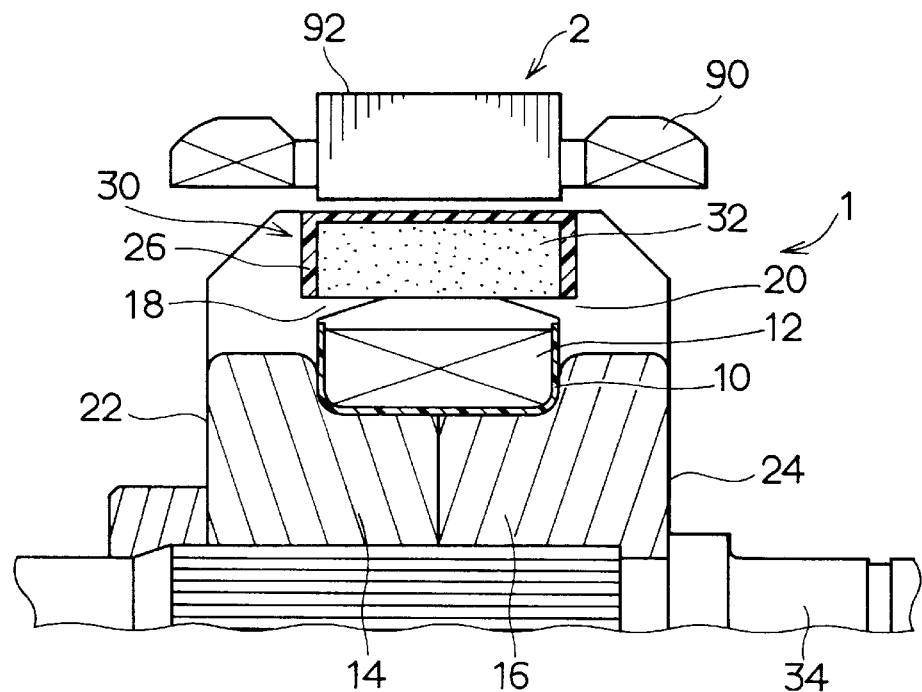
FIG. 1 is a partial cross sectional view of an alternator according to a first embodiment of the present invention.
Figure 2:
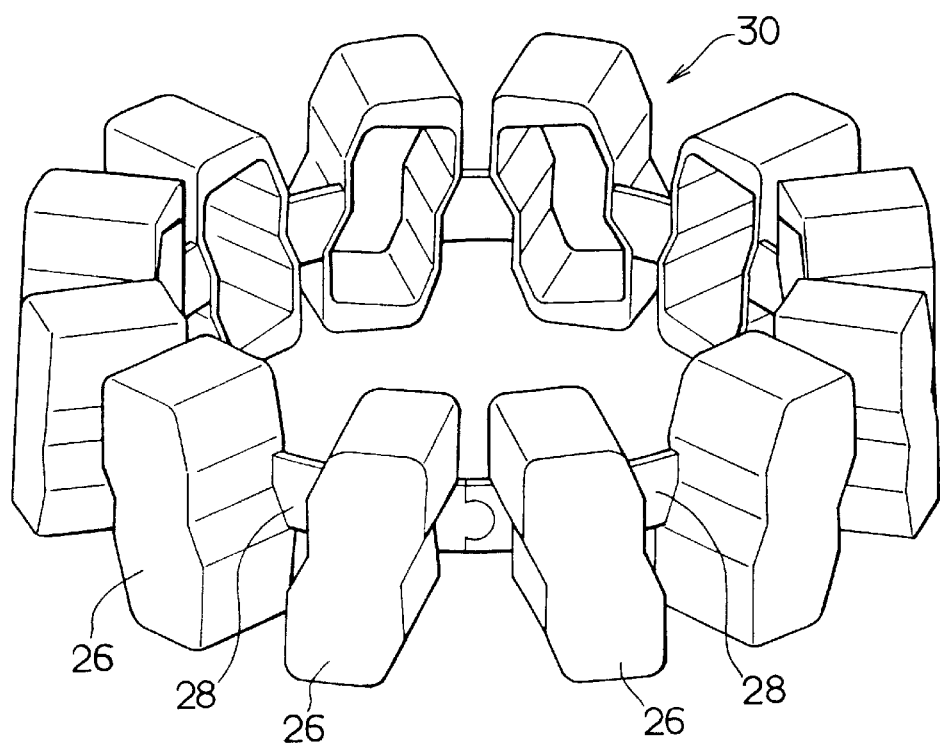
FIG. 2 is a perspective view showing a magnet holding member used in the first embodiment shown in FIG. 1.

An alternating current generator for a vehicle (alternator) shown in FIG. 1 has a Lundell-type rotor 1 and a stator 2 disposed radially outside the rotor 1. The rotor 1 comprises a field coil 12 which is made by winding an insulated copper wire around a bobbin 10 concentrically in the shape of a cylinder, a pair of pole cores 22 and 24 having six-pole claws 18 and 20 which are connected to core portions 14 and 16 in the center and are bent in the axial direction in the radially outer peripheral portion, and a rotary shaft 34. The rotor 1 supports firmly thereon a magnet holding member 30 formed in the shape of a curved creating a belt-like member. The holding member 30 is made, as shown in FIG. 2, by connecting through connecting parts 28 twelve housing parts 26 to be inserted between the adjacent claws 18 and 20 along the direction of the rotation. Twelve permanent magnets 32 are inserted in the housing parts 26. A ferrite magnet, a neodymium magnet, a rare earth metal magnet, or the like, for example, is used as the permanent magnet 32.

The stator 2 disposed in the outer peripheral side of the rotor 1 is made by winding insulated three-phase stator windings 90 around a stator core 92.

As shown in FIG. 2, the magnet holding member 30 has twelve housing parts 26 arranged in an annular shape before being assembled with the rotor 1. The magnet holding member 30 has, in addition to the housing parts 26, flexible connecting parts 28 for partially connecting the side faces of the adjacent pairs of the housing parts 26 and to form a belt. Each connecting part 28 is put into intimate contact with the back surfaces of the claws 18 and 20, when the magnet holding member 30 is assembled onto the rotor 1, and when the rotor 1 is rotated, radially restrains the magnet holding member 30.

Figure 3:
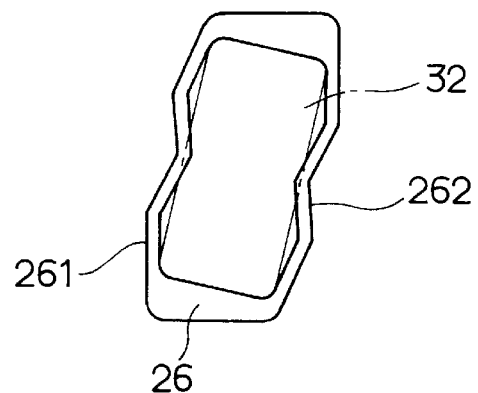
FIG. 3 is a schematic view showing a single housing part of the magnet holding member shown in FIG. 2.

Each housing part 26 is, as shown in FIG. 3, in a generally box-like shape and receives therein the permanent magnet 32. The housing part 26 has an opening into which the permanent magnet 32 having a rectangular shape is inserted, and is arranged such that the opening face faces the inner peripheral side in the radial direction when it is assembled onto the rotor 1. Each housing part 26 is formed such that, even if the magnet holding member 30 is formed in the shape of a belt, the permanent magnet 32 is pressed into the box thereof and is fixedly held.

Furthermore, two opposed side surfaces of the housing part 26 in the side where the connecting part 28 is formed are corrugated. The corrugated side surfaces 261 and 262 are made such that, when the permanent magnet 32 is inserted, a part of these corrugated side surfaces 261 and 262 are put into contact with the permanent magnet 32. Thus, when the permanent magnet 32 is pressed into the housing part 26, the corrugated side surfaces 261 and 262 flex and widen the contact portions so that the permanent magnet 32 is held fixedly therein.

The permanent magnets 32 are magnetized and arranged in the direction that diminishes a magnetic flux leakage between the claws 18 and 20 of the pole cores 22 and 24 and are inserted the housing parts 26 of the magnet holding member 30. Moreover, the housing parts 26 and the connecting parts 28 of the magnet holding member 30 are formed by a non-magnetic material. For example, a flexible resin material such as nylon, PPS, or the like, or a metal material such as stainless steel, aluminum, or the like may be used such that the magnetic flux leakage through the magnet holding member 30 is not increased.

Figure 4:
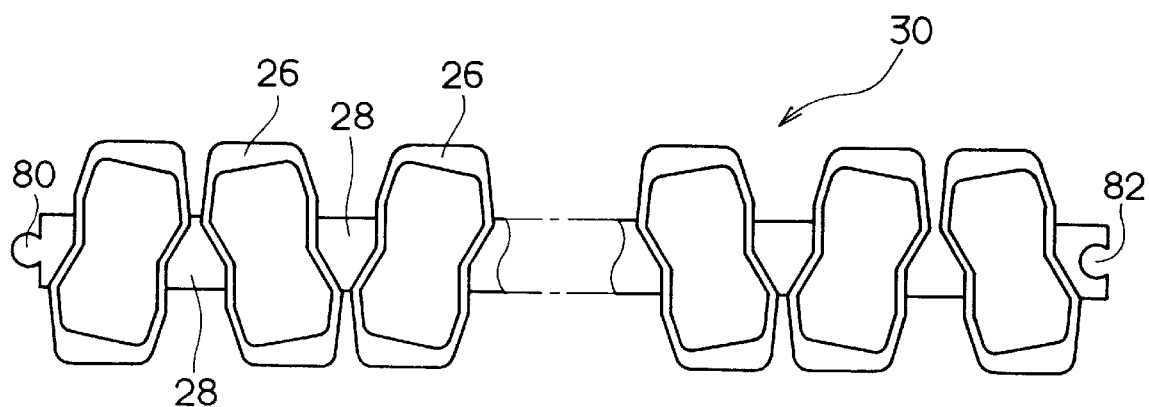
FIG. 4 is a schematic view showing the state in which the magnet holding member according to the first embodiment is manufactured.

As shown in FIG. 4, the housing parts 26 which are connected by the connecting parts 28 are arranged in the shape of a straight belt and are manufactured 30 by die-casting process or the like simultaneously with the connecting parts 28. The magnet holding member 30 is formed in the shape that twelve housing parts 26 are arranged in the shape of a belt and then are connected by the connecting parts 28. Since the opening faces into which the permanent magnets 32 are to be inserted face in the same direction, the housing parts 26 and the connecting parts 28 which are arranged in the shape of a belt can be easily manufactured by using two-way dies.

After the magnet holding member 30 is manufactured in the state in which the housing parts 26 of the magnet holding member 30 are arranged in the shape of a belt, it is curved such that the opening faces of the housing parts 26 face inner peripheral side in the radial direction and is bent to form an overall annular shape. As shown in FIG. 2, since the connecting parts 28 for connecting the housing parts 26 are formed like flexible belt plates, the magnet holding member 30 can be rounded into the annular shape as a whole by gripping the housing parts 26 disposed at both ends of the belt and the connecting parts 28 disposed at both ends of the belt are mechanically joined to each other, whereby the annular magnet holding member 30 shown in FIG. 2 is formed as a single unit.

The connecting parts 28 disposed at both ends of the belt are joined to each other by pressing a projection 80 formed at the connecting part 28 of one end of the belt into a recess 82 formed at the connecting part 28 of the other end of the belt. However, this mechanical joining may be replaced by thermal fusion, adhesive joining, or the like.

As described above, the magnet holding member 30 included in the rotor 1 of the alternator of the first embodiment is manufactured in the state in which twelve housing parts 26 are expanded in the shape of a belt and are connected by the connecting parts 28. The magnet holding member 30 is assembled in the state in which it is rounded into an annular shape after the permanent magnets 32 are inserted into the corresponding housing parts 26. Therefore, inexpensive two-way dies can be used for manufacturing it, whereby a manufacturing process can be made simple and thus manufacturing costs can be reduced.

Moreover, since each housing part 26 of the magnet holding member 30 has the corrugated side surfaces 261 and 262 put into contact with the claws 18 and 20 of the pole cores 22 and 24, even if a working accuracy or an assembling accuracy is not good, when the magnet holding member 30 is assembled, the corrugated portions function as a shock absorbing structure. Thus, problems are not encountered such as cracking or partial chipping of the permanent magnet 32 due to local or concentrated excessive stress exerted on the permanent magnet 32.

Modifications of First Embodiment

Figure 5:
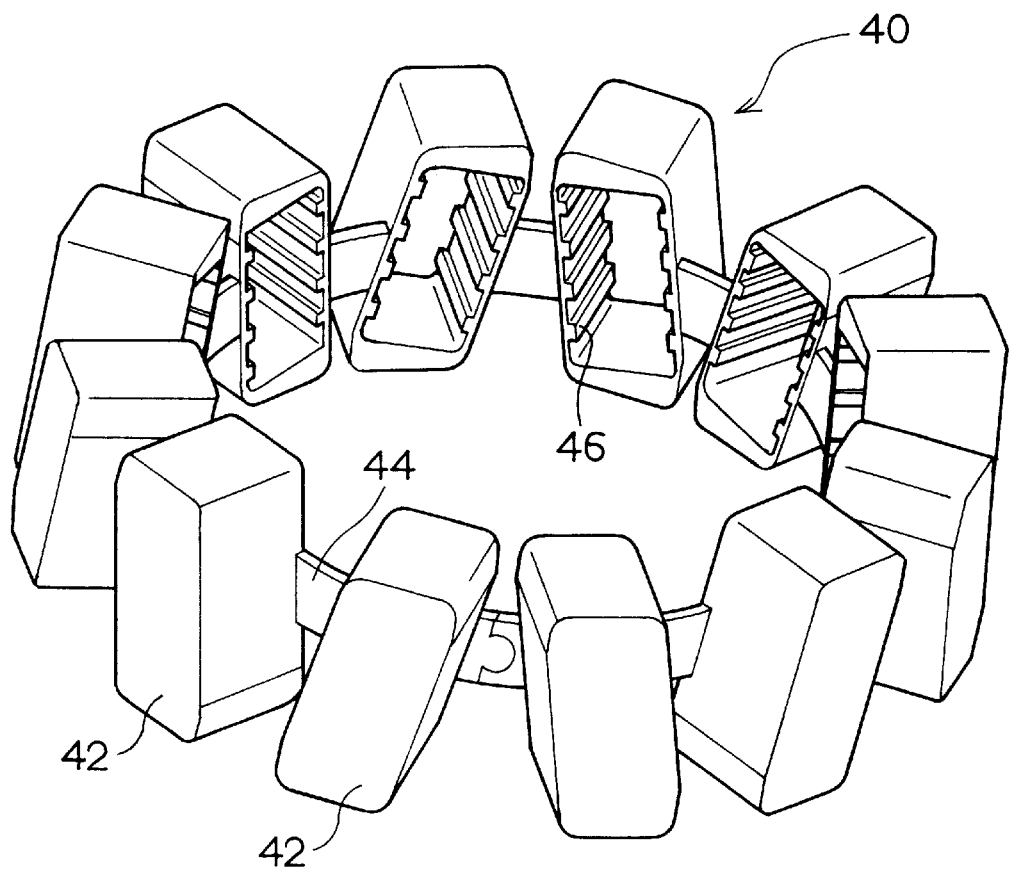
FIG. 5 is a perspective view showing a magnet holding member according to a modification of the first embodiment.
Figure 6:
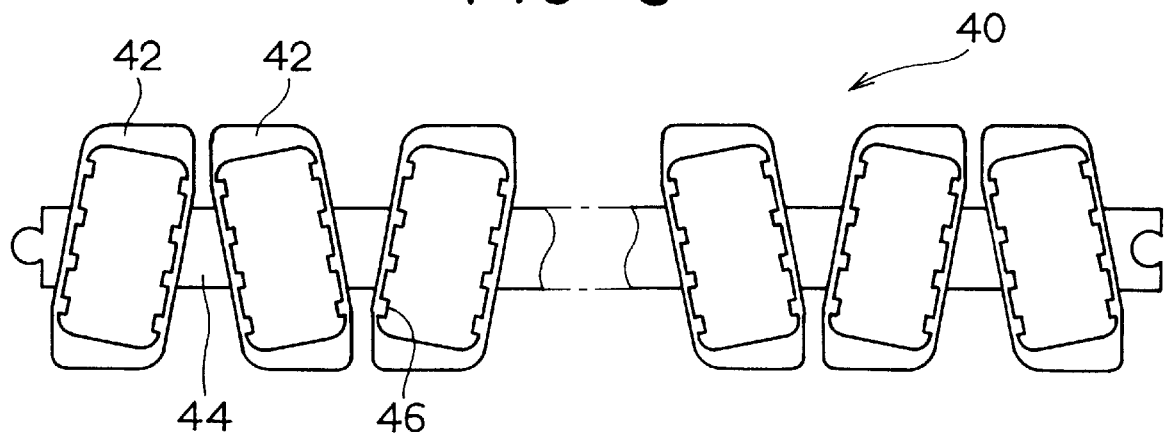
FIG. 6 is a schematic view showing the state in which the magnet holding member shown in FIG. 5 is manufactured.

A magnet holding member 40 is constructed as shown in FIG. 5. It has twelve housing parts 42 for holding permanent magnets 32 and connecting parts 44 for partially connecting the side surfaces of the adjacent pairs of the housings 42 to each other. The housing parts 42 and the connecting parts 44 are formed of a flexible non-magnetic resin material such as nylon, PPS, or the like. Moreover, as is the case with the housing part 26 shown in FIG. 2, each housing part 42 is in a box-like shape having an opening face into which the permanent magnet 32 is inserted and is arranged such that the opening face faces the inner side in the radial direction when the magnet holding member 40 is assembled onto the rotor 1.

A plurality of projections 46 (for example, four projections) parallel to the direction of the insertion of the permanent magnet 32 are formed on the inner walls of two side surfaces of the housing part 42 on the side on which the connecting part 44 is formed. Each permanent magnet 32 is pressed between the projections 46 formed on two opposed side surfaces of each housing part 42 and thus is held therebetweeen. The projections 46 also function as the shock absorbing structures when the working accuracy or the assembling accuracy of the pole cores 22 and 24 is not good. When an interval between the neighboring claws 18 and 20 in the direction of the rotation is narrower than the width of the housing part 42, the housing part 42 must be pressed from the lateral direction and thus stress is likely concentrated on the projections 46. In this instance, however, since the projections 46 are formed of a flexible material, they are deformed, whereby the stress exerted on the permanent magnet 32 can be relieved.

Moreover, the magnet holding member 40, as is the case with the magnet holding member 30 shown in FIG. 2, is manufactured by die-casting the housing parts 42 and the connecting parts 44 such that the housing parts 42 are arranged in the shape of a belt with the connecting parts 44 disposed therebetween. Then the permanent magnets 32 are pressed into the opening faces of the housing parts 42. Then, the assembly of the housing parts 42, the connecting parts 44 and the permanent magnets 32 is deformed in the annular shape such that the opening faces of the housing parts 42 face the inner side in the radial direction and is assembled onto the rotor 1.

The magnet holding member 40 is easily manufactured by using two-way dies, as is the case with the magnet holding member 30 shown in FIG. 2. In addition, even if excessive stress caused by the bad working accuracy or bad assembling accuracy of the pole cores 22 and 24 is exerted on the magnet holding member 40 when the magnet holding member 40 is assembled, it is absorbed by the deformation of the projections 46, which eliminates the trouble that the permanent magnets 32 are cracked or partially chipped.

Figure 7:
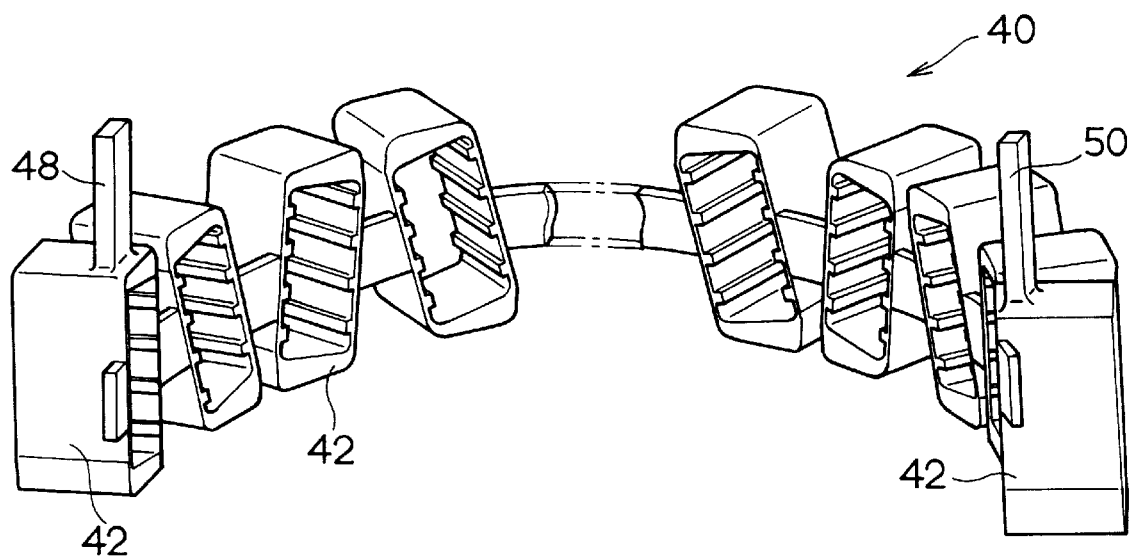
FIG. 7 is a partial perspective view of a magnet holding member according to a further modification of the first embodiment.

In the structure shown in FIGS. 2 to 6, if the housing parts 26 and 42 disposed at both ends of the connecting parts 28 and 44 are gripped by the steel-made arms of an assembling device, the arms may become magnetized and attract foreign matter made of steel or the like. In order to overcome this problem, according to a further modification shown in FIG. 7 which is directed to the modification of FIG. 6, grip portions 48 and 50 which extend in the direction of the rotary shaft 34 are integrally formed on two housing parts 28 and 42 disposed at both ends of the magnet holding member 30 and 40. Since the whole magnet holding member 30 and 40 can be deformed in the annular shape by gripping the grip portions 48 and 50 with the arms of the assembling device, the arms of the assembling device are not magnetized by the permanent magnets 32 in the housing parts 28 and 42.

Figure 8:
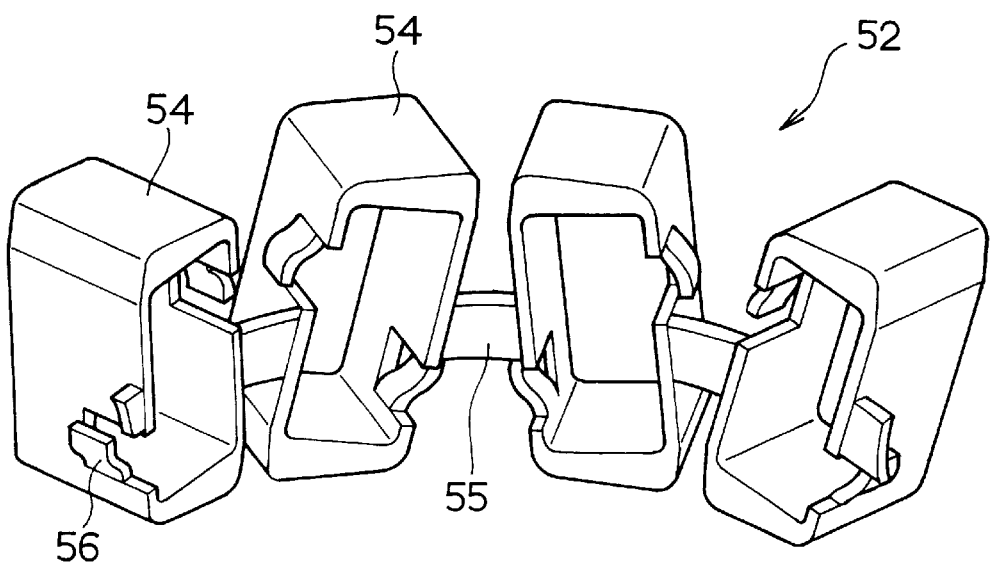
FIG. 8 is a partial perspective view of a magnet holding member according to a still further modification of the first embodiment.

According to a further modification shown in FIG. 8, a magnet holding member 52 has housing parts 54 in a box-like shape composed of flat side surfaces having no corrugation nor projection and a part of each side surface is cut away and bent outward to form a bent portion 56. The housing parts 54 and connecting parts 55 for connecting neighboring housing parts 54 to each other are formed of a non-magnetic resin material or a metal material, as is the case with the magnet holding member 30. Since the width in the direction of the rotation of the housing part 54 is set narrower than the interval between the claws 18 and 20 of the pole cores 22 and 24 and the bent portions 56 made on the side surface of the housing part 54 are pressed on the side surfaces of the claws 18 and 20 of the pole cores 22 and 24, the housing part 54 is restrained between the claws 18 and 20 fixedly. Thus, even if the working accuracy or the assembling accuracy of the pole cores 22 and 24 is not good, the errors in working or assembling can be absorbed by the bent portions 56 of the housing parts 54, whereby excessive stress is not exerted on the permanent magnets 32 pressed into the housing parts 54.

Figure 9:
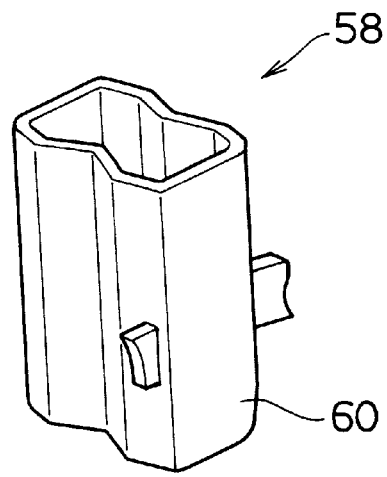
FIG. 9 is a partial perspective view of a magnet holding member according to a still further modification of the first embodiment.

The housing parts 26 and 42 may be modified further so that each permanent magnet 32 may be pressed into the housing parts 26 and 42 after the magnet holding member 30 or 40 is rounded into the annular shape and is assembled on the rotor 1. As shown in FIG. 9, each housing part 60 of a magnet holding member 58 has a box-like shape in which the opening face into which the permanent magnet is inserted is formed in the direction along the rotary shaft 34 of the rotor 1 and two side surfaces opposed to the claws of the pole cores are formed in the corrugated shape which is corrugated in the radial direction of the rotor 1.

Figure 10:
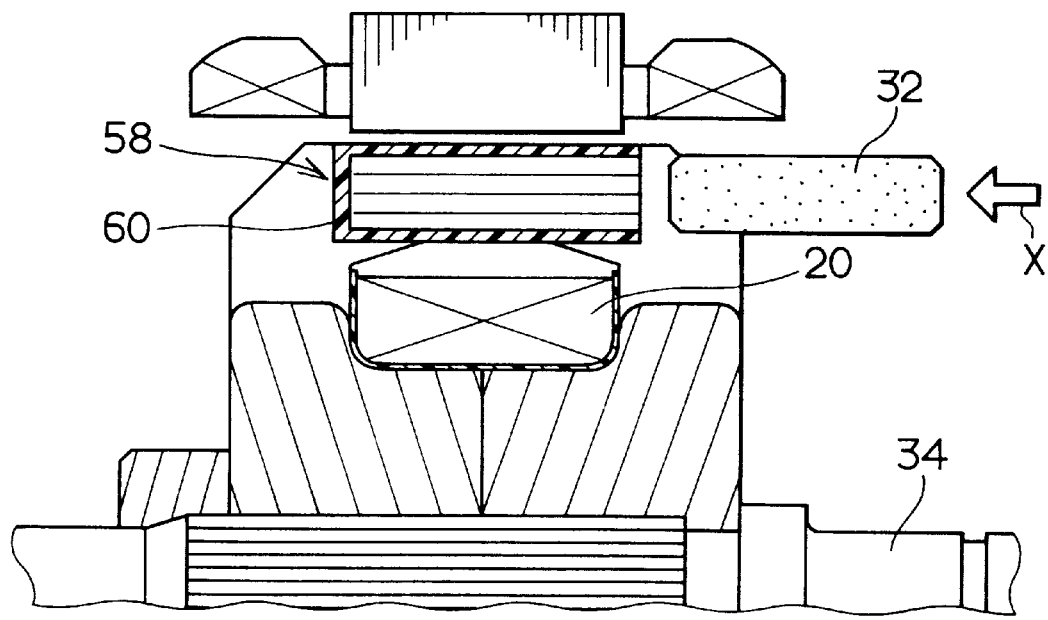
FIG. 10 is a partial sectional view of a process for assembling the magnet holding member shown in FIG. 9 and a permanent magnet.

The magnet holding member 58, as is the case with the magnet holding member 30, can be manufactured by die-casting the housing parts 60 in the state that they are arranged in the shape of a belt as shown in FIG. 4. The housing parts 60 disposed at both ends of the belt are gripped in the state that they are arranged in the shape of a belt and are rounded and then assembled on the rotor without pressing the permanent magnets 32 into the housing parts 60. Then, as shown in FIG. 10, the permanent magnets 32 are pressed into the housing parts 60 in an axial direction X along the rotary shaft 34.

Moreover, the position of the opening face of the housing part 60 of the magnet holding member 58 shown in FIG. 9 is different from that of the housing part 26 of the magnet holding member 30 shown in FIG. 2, and the direction of corrugation is changed in accordance with the direction that extracts the dies. The same modifications may be made for the other magnet holding members. For example, it is recommended for the magnet holding member 40 shown in FIG. 5 that the opening faces be formed in the upper portion and the projections 46 of the side surfaces be formed in the direction along the rotary shaft 34.

Figure 11:
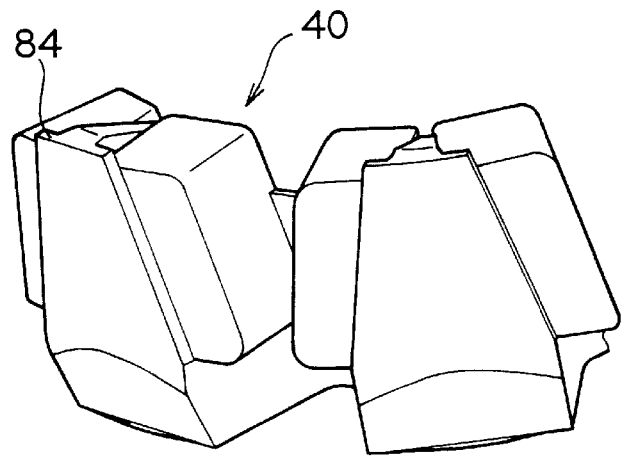
FIG. 11 is a partial perspective view of the state in which the magnet holding member is assembled when it is combined with a pole core with collars.

Furthermore, the magnet holding members 30, 40, 52 and 58 may be modified to have collars or flanges near the outer peripheral surfaces of the claws 18 and 20 as shown in FIG. 11. That is, in case the magnet holding member 40 is combined with pole cores having collars 84, the magnet holding member 40 into which the permanent magnets 32 are pressed may be held radially inside the collars 84 formed on the claws 18 and 20.

Figure 12:
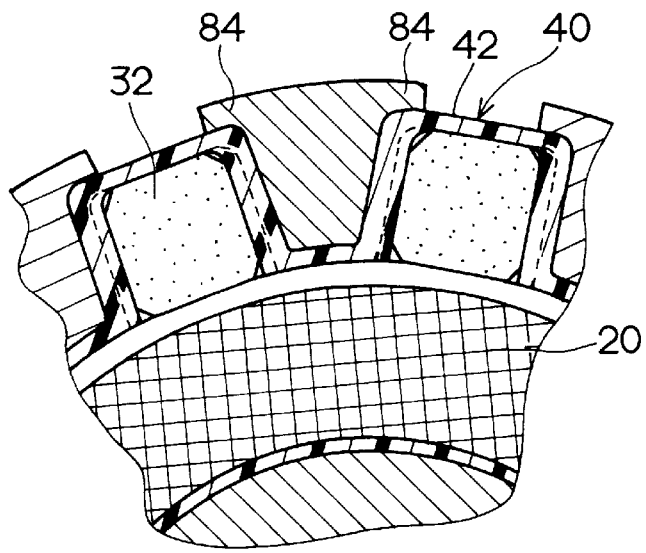
FIG. 12 is a partial cross sectional view of the rotor shown in FIG. 11 in a direction perpendicular to a rotary shaft.
Figure 13:
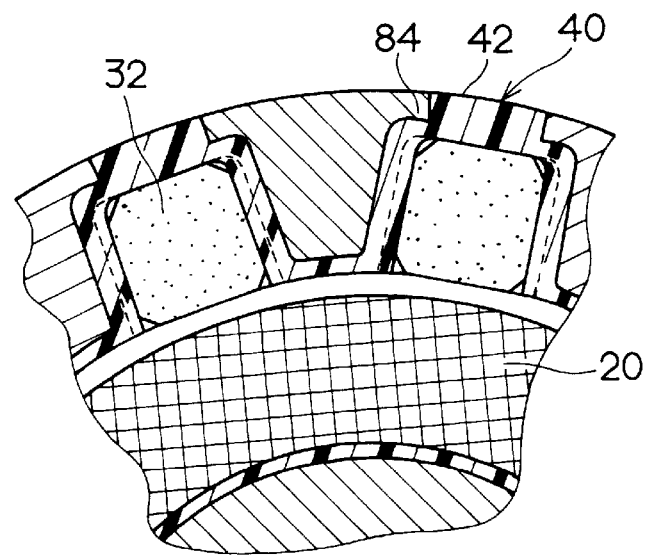
FIG. 13 is a cross sectional view showing a modification of the magnet holding member shown in FIG. 11.

Alternatively to the modification shown in FIG. 12, the magnet holding member 40 may be shaped as shown in FIG. 13. That is, the outer peripheral shape of each housing part 42 of the magnet holding member 40 is changed so as to fill the gap between the collars 84 of the adjacent claws 18 and 20. Thus, the projections and depressions are eliminated from the outer peripheral surface of the rotor 1, which can reduce noises when the rotor 1 is rotated.

Further, although the magnet holding member of the first embodiment and its modifications is first formed in the shape of a belt and then is deformed into an annular shape, the magnet holding member having a shock absorbing structure is enough for the purpose of preventing the permanent magnet from being cracked is and in this case the magnet holding member may be formed in the annular shape from the beginning. Further, although the projections of the housing parts are formed only on the inner side surfaces of two opposed sides, those may be formed only on one inner side surface, the outer side surface, or both inner and outer side surfaces of each side. Furthermore, it is important that the housing parts hold the permanent magnets and those may have a basket-like shape or a clip-like shape instead of a box-like shape. In addition, the magnets may be molded by resin together with the holding members. Further, although all housing parts and connecting parts of the magnet holding member are integrally formed, the housing parts and the connecting parts may be separately formed previously and be combined with each other before being assembled with the rotor. For example, twelve box-like housing parts having a through hole in the sides are separately formed and the permanent magnets are pressed into the housing parts. Then a piece of connecting part is passed through the through holes in the sides of the housing parts to accomplish a magnet holding member in the shape of a belt as a whole. Then, as is the case with the magnet holding members described above, it is recommended that the accomplished magnet holding member be deformed into the annular shape and be assembled on the rotor.

Second Embodiment

Contrary to the magnet holding members according to the first embodiment and its modifications, the magnet holding member may have a simple shape having no shock absorbing structures.

Figure 14:
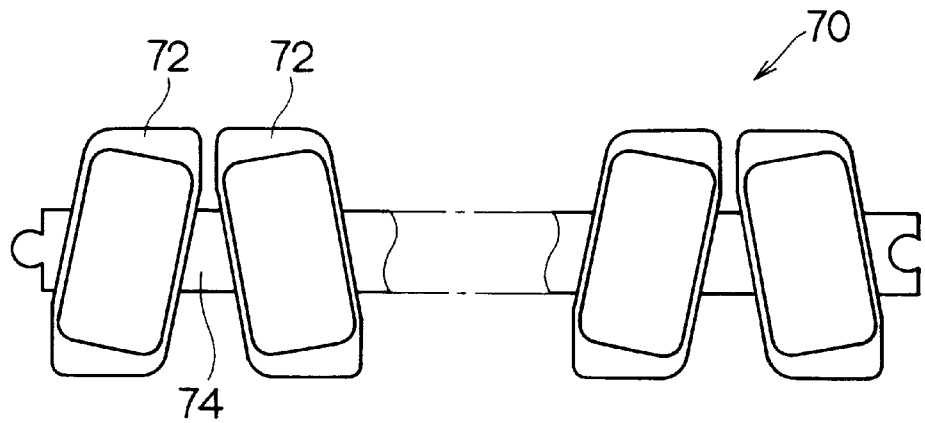
FIG. 14 is a partial schematic view showing partially a magnet holding member according to a second embodiment of the invention.
Figure 15:
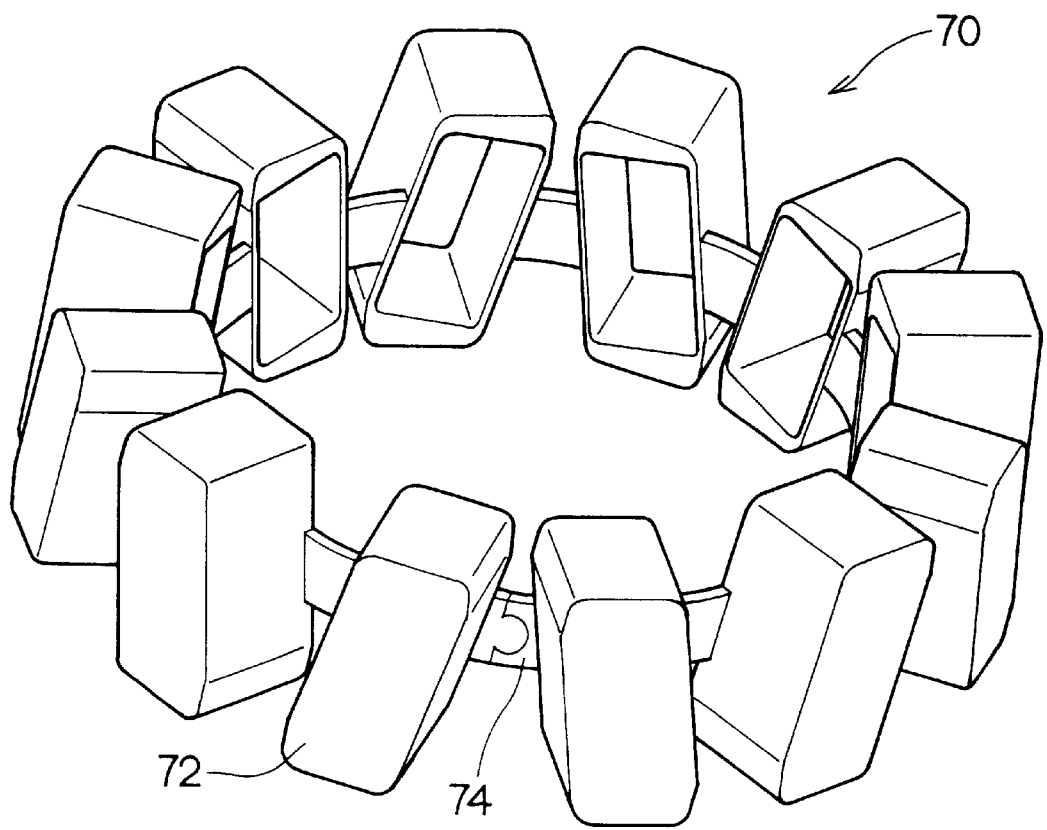
FIG. 15 is a perspective view showing the magnet holding member according to the second embodiment.

As shown in FIGS. 14 and 15, a magnet holding member 70 has twelve housing parts 72 which have no shock absorbing structures. The housing parts 72 are arranged in the shape of belt and are connected to each other via a connecting parts 74. Each permanent magnet 32 is inserted into each housing part 72 and then the whole magnet holding member 70 is deformed into an annular shape as shown in FIG. 15. The housing parts 74 disposed at both ends thereof are mechanically joined to each other, whereby the annular magnet holding member 70 used for assembling onto the rotor 1 is provided. The deformation of the magnet holding member 70 in this manner can be easily made by grip portions integrally formed on the housing parts 72 disposed on both ends thereof, as is the case with the magnet holding member shown in FIG. 7.

Since the magnet holding member 70 is manufactured in the state that the housing parts 72 are arranged in the shape of a belt via the connecting parts 74, it can be manufactured by using the simple two-way dies, which can reduce man-hours and costs required for manufacturing. Moreover, if the magnet holding member 70 whose housing parts 72 are arranged in the shape of a belt is deformed into an annular shape and the connecting parts 74 disposed at both ends thereof are joined to each other, it can be handled as a single annular part and can be easily assembled onto the rotor.

Figure 16:
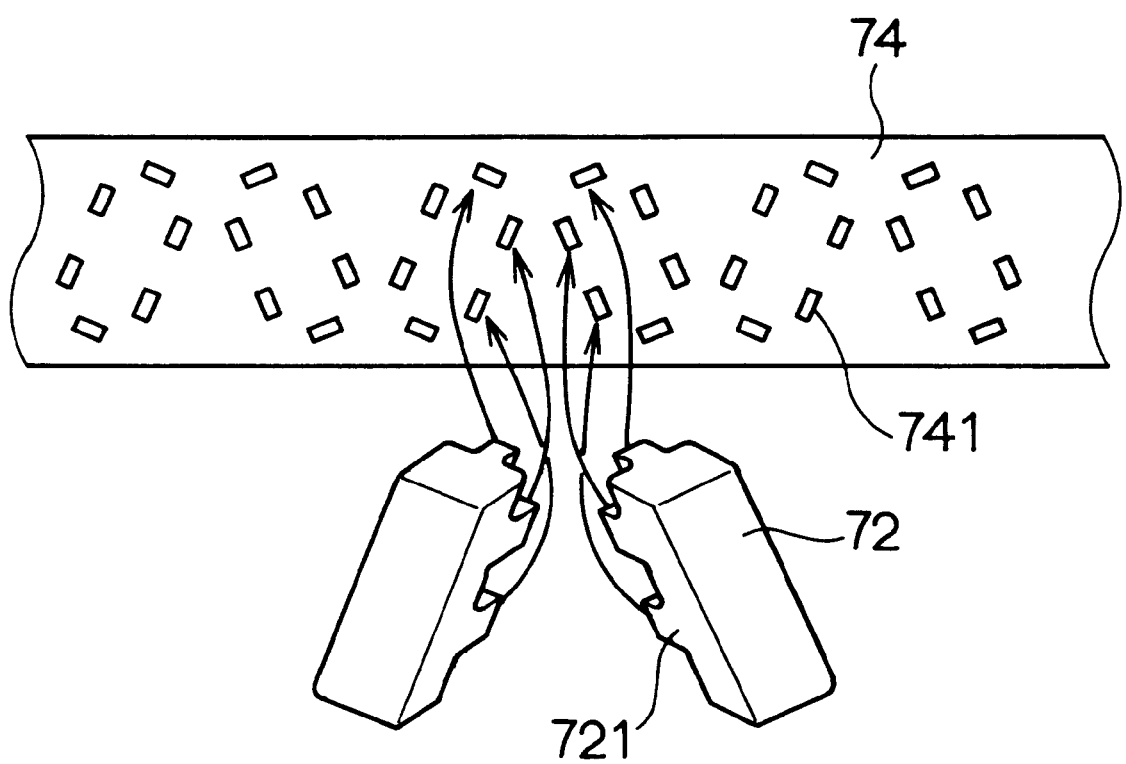
FIG. 16 is a perspective view showing a modification of the magnet holding member according to the second embodiment.

In the second embodiment, as shown in FIG. 16, the magnet housing part 72 may be constructed separately from the magnet connecting part 74. The magnet housing part 72 is formed as a simple box-like part and a permanent magnet is inserted into it. Then fixing projections 721 made on each housing part 72 are mated with and are fixed to corresponding fixing holes 741 made in the connecting part 74. Then, the whole assembly is deformed into an annular shape and is mounted such that it is mated with the claws. The connecting part 74 covers the opening side of each housing part 72 so that all the surfaces of the permanent magnet 32 may be covered. Thus, even if the permanent magnet 32 happens to crack or chip, the cracked or chipped pieces do not jump out. Moreover, if a certain tightening tolerance is provided, the stress exerted from the claws when the magnet holding member 70 is assembled can be absorbed by the movement of the housing parts 72.

The present invention is not intended to be limited to the above-described embodiments and modifications, but rather is intended to encompass all modifications and alterations included within the spirit and scope of the invention. For instance, in the above embodiments and modifications, it is also possible to manufacture a connecting member for connecting only four housing parts instead of connecting all housing parts. Then, three connecting members each having four housing parts can be connected to make one annular magnet holding member having twelve housing parts, as is the case with each embodiment. Moreover, when the magnet holding member is manufactured, a belt-like member for connecting still more housing parts than the gaps between the claws may be divided by a required number of housing parts and then those may be assembled into an annular magnet holding member.

In addition, the present invention can be also applied to the brushless alternator having no slip ring on the rotor, a generator used for other than a vehicle, or an electric motor having a Lundell core type rotor. Furthermore, the Lundell core type described above may include not only a pole core whose claws are tapered toward the tip but also a pole core whose claws have the same width.

I claim:

1. A Lundell core type rotary electric machine comprising:
    a stator;
    a rotor disposed radially inside said stator and including a pair of pole cores, each of said pole cores comprising a plurality of claws;
    a permanent magnet dimensioned and configured to be disposed between a pair of said claws;
    a magnet holding member capable of being mounted onto said rotor and carrying said permanent magnet before, during, and after mounting said magnet holding member onto said rotor, said magnet holding member when mounted onto said rotor holding said permanent magnet between said pair of claws, said magnet holding member further comprising an integrally formed shock absorbing structure in contact with at least one of said permanent magnet and said claws, said integrally formed shock absorbing structure being deformable when said magnet holding member is mounted on said rotor and is holding said permanent magnet between said claws, thereby diminishing stress exerted on said permanent magnet by said rotor, said shock absorbing structure comprising a flexible portion having a shape and configuration for provisionally holding said permanent magnet before said magnet holding member is mounted onto said rotor.

2. The electric machine according to claim 1, wherein said magnet holding member comprises a box-like housing part, said box-like housing part being inserted between a pair of adjacent ones of said claws and housing said permanent magnet before and during insertion of said boxed-like housing part into said pair of adjacent ones of said claws, said shock absorbing structure being provided on at least one side surface of a portion of said housing part which is sandwiched between said permanent magnet and said claws.

3. The electric machine according to claim 2, wherein said shock absorbing structure comprises a portion having a corrugated shape provided on said at least one side surface of said housing part.

4. The electric machine according to claim 2, wherein said shock absorbing structure comprises a partial projecting shaped portion provided on said at least one side surface of said housing part.

5. The electric machine according to claim 2, wherein said shock absorbing structure comprises a cut-away portion of said side portion of said housing part, said cut-away portion being bent so as to protrude from said at least one side surface of said housing part.

6. The electric machine according to claim 2, wherein said magnet holding member comprises a plurality of said housing parts disposed at a plurality of respective different locations and a plurality of connecting parts for interconnecting said housing parts.

7. The electric machine according to claim 2, wherein said magnet holding member comprises a plurality of said housing parts and a plurality of connecting parts for interconnecting said plurality of said housing parts, said magnet holding member being in the form of a belt-like member when said plurality of said housing parts are connected with said connecting parts and being deformed into the shape of a curve.

8. The electric machine according to claim 7, wherein said magnet holding member comprises a belt-like assembly, said belt-like assembly comprising first and second terminating ends, said magnet holding member comprising mechanical joining parts provided at said first and second terminating ends, said mechanical joining parts being engageable with each other so as to shape said belt-like assembly into an annular belt assembly.

9. The electric machine according to claim 8, wherein certain ones of said housing parts comprise an integrated grip portion so that said magnet holding member may be curved to form said belt-like member by gripping and maneuvering said grip portions.

10. The electric machine according to claim 9, wherein certain housing parts comprise first and second housing parts respectively disposed close to said first and second ends of said belt-like assembly.

11. The electric machine according to claim 2, wherein said box-like housing part comprises a box-like opening into which said permanent magnet is inserted before said magnet holding member is mounted onto said rotor, said magnet holding member when mounted onto said rotor having an inner side facing toward axis of rotation of said rotor and an outer peripheral side facing radially away from said axis of rotation, said box-like opening of said housing part being on said inner side of said magnet holding member and facing said axis of rotation when said magnet holding member is mounted onto said rotor, thereby requiring that said permanent magnet is inserted into said housing part before said magnet holding member is mounted onto said rotor.

12. The electric machine according to claim 2, wherein said housing part comprises a box-like opening into which said permanent magnet is inserted in an axial direction facing an axis of rotation of said rotor, wherein said permanent magnet is insertable into said housing part after said magnet holding member is mounted onto said rotor.

13. The electric machine according to claim 2, wherein said claw comprises a collar disposed along an outer peripheral surface of said rotor, said housing part comprising an outer peripheral surface which partially contacts said collar.

14. The electric machine according to claim 2, wherein said shock absorbing structure comprises projecting portions projecting inwardly from a side surface of said housing part so as to partially contact said permanent magnet.

15. A Lundell core type rotary electric machine having a rotor, said rotor comprising:

a pair of pole cores, each said pole core having a plurality of claws;

a plurality of permanent magnets, each said permanent magnet being disposed between a pair of adjacent ones of said claws; and a magnet holding member having a plurality of housing parts for holding said permanent magnets and further comprising connecting parts for connecting said housing parts, said magnet holding member being formed into an annular belt-like assembly by connecting with said connecting parts said plurality of housing parts, said connecting parts comprising connecting members formed of a deformable material so as to assume an annular shape when said housing parts are interconnected.

16. The electric machine according to claim 15, wherein said magnet holding member, when connected by connecting said housing parts with said connecting parts, comprises a belt-like assembly comprising first and second terminating ends, said magnet holding member further comprising mechanical joining parts at said first and second terminating ends for joining said first and second terminating ends to each other.

17. The electric machine according to claim 16, wherein certain ones of said housing parts comprise an integrated grip portion thereby allowing said belt-like assembly to be curved by gripping said integrated grip portions.

18. The electric machine according to claim 17, wherein said certain housing parts are respectively disposed at said first and second terminating ends of said belt-like assembly.

19. The electric machine according to claim 15, further comprising:

shock absorbing structures, each of said shock absorbing structures being formed on at least one side surface of a portion of each said housing part which portion is sandwiched between one of said permanent magnets and one of said claws, each said shock absorbing structure being put into partial contact with at least one of said permanent magnets and at least one of said claws and being deformed when said magnet holding member is mounted onto said rotor, thereby diminishing stress exerted on said permanent magnets when said permanent magnets are held between said pairs of adjacent claws when said magnet holding member is mounted onto said rotor.

20. The electric machine according to claim 15, wherein said claws comprise respective collars positioned along a radially outer peripheral surface of said rotor, each said housing part comprising an outer peripheral surface, and wherein when said belt-like assembly is arranged in an annular shape and is mounted to said rotor, said outer peripheral surface of each said housing part being in partial contact with each said collar.

21. The electric machine according to claim 15, wherein a thickness of said connecting parts, measured along a radial direction extending radially outwardly from the axis of rotation of said rotor when said magnet holding member is mounted onto said rotor, is less than a width of said connecting parts measured along an axial direction parallel to said axis of rotation of said rotor, thereby making said connecting parts more pliable in the radial direction than in the axial direction.

22. A rotary electric machine comprising:

a stator;

a motor disposed radially inside said stator and including a pair of pole cores, each of said pole cores comprising a plurality of claws;

a plurality of permanent magnets disposed between respective pairs of adjacent ones of said claws; and a magnet holding member comprising a plurality of box-like housing parts, each said box-like housing part receiving one of said permanent magnets therein, said magnet holding member further comprising connecting parts connecting said housing parts to form an annular ring-shaped belt-like assembly, each said housing part comprising a flexible side portion partially contacting each claw of each pair of claws.

23. The electric machine according to claim 22, wherein said flexible side portions comprise corrugations formed on side surfaces of each of said housing parts.

24. The electric machine according to claim 22, wherein said flexible side portions extend outwardly from side surface of each of said housing parts.

25. The electric machine according to claim 22, wherein each of said housing parts comprises an opening, said opening facing radially inward toward an axis of rotation of said rotor when said magnet holding member is mounted to said rotor.

26. A Lundell core type rotary electric machine comprising:

a stator;

a rotor rotatable about an axis of rotation within said stator and having a pole core portion, said rotor further comprising pairs of opposing claws extending from said pole core portion;

permanent magnets dimension and configured to be disposed between respective ones of said pairs of opposing claws; and a holding member for holding said permanent magnets, said holding member being capable of being mounted onto said rotor and carrying said permanent magnets before, during, and after mounting said holding member onto said rotor, said holding member when mounted onto said rotor holding respective ones of said permanent magnets between respective ones of said pairs of opposing claws, said magnet holding member further comprising resilient and deformable protrusions serving as cushioning junctures between said permanent magnets and corresponding ones of said pairs of opposing claws.

* * * * *